United States Patent Office 3,640,892
Patented Feb. 8, 1972

3,640,892
ENCAPSULATION PROCESS AND ITS PRODUCT
Antoinette M. Purcell, Cranbury, N.J., assignor to The National Cash Register Company, Dayton, Ohio
No Drawing. Filed June 24, 1969, Ser. No. 836,148
Int. Cl. B01j 13/02; B44d 1/02
U.S. Cl. 252—316                                     9 Claims

ABSTRACT OF THE DISCLOSURE

A process is provided for manufacturing minute capsules, en masse, in a liquid manufacturing vehicle, which capsules have walls of a substantially homogeneous solid solution of at least two polymeric materials. The novel process includes a liquid-liquid phase separation which is accomplished by heating a solution of two polymeric materials in an organic solvent. The polymeric materials comprise polymeric capsule wall material, viz, halogenated rubber, and polymeric liquid-liquid phase-separation-inducing material, viz, poly(ethylene-co-vinyl acetate) or poly(vinylmethyl ether), which dissolve together as a single phase in the manufacturing vehicle below a certain phase separation temperature and which exist, above the phase separation temperature, as separated components of two liquid phases.

BACKGROUND OF THE INVENTION

Field of the invention

This invention pertains to a process for making minute capsules, en masse, in a liquid manufacturing vehicle which process includes a step of liquid-liquid phase separation of polymeric capsule wall material from polymeric phase-separation-inducing material above a certain phase separation temperature and it also relates to the capsules produced thereby. It more specifically pertains to the above process wherein the capsules are produced to contain water, aqueous solutions, or water-sensitive materials and wherein the capsule walls comprise a substantially homogeneous solid solution of a major portion of hydrophobic polymeric capsule wall material and a minor portion of hydrophobic polymeric phase-separation-inducing material.

This invention also relates to the above process wherein there is included an additional step of over-coating the capsules with a waxy material to provide a dual-layered capsule wall construction of a first or interior layer, adjacent to the capsule core material, of the substantially homogeneous solid solution of polymeric materials and a second or exterior, over-coating, layer of the waxy material and to the capsules produced thereby.

Description of the prior art

United States Pat. No. 3,244,640 issued Apr. 5, 1966 on the application of Peter Studt, et al. discloses a process for preparing capsules containing substantially water-insoluble liquids wherein a single, specifically identified, polymeric capsule wall material is caused to undergo liquid-liquid phase separation, from an aqueous vehicle, at an elevated temperature. Once having caused phase separation and having formed capsule envelopes of the separated liquid phase about droplets of the liquid to be encapsulated, it is required by the teaching of the above-mentioned patent, that the liquid capsule envelopes be chemically hardened by adding a chemical agent while maintaining the elevated temperature. The process of the present invention utilizes two hydrophobic polymeric materials in an organic solvent and liquid-liquid phase separation is accomplished by heating the system. The process of the present invention does not require chemical cross-linking of a separated liquid phase in order to produce solid-walled capsules. Moreover, the final capsule wall produced by the present invention is free from possible contamination by insoluble inorganic salts.

United States Pat. No. 3,415,758 issued Dec. 10, 1968 on the application of Thomas Powell et al. and assigned to the assignee herein discloses a process for preparing capsules wherein hydrophobic polymeric capsule wall material is deposited by liquid-liquid phase separation onto aqueous or water-sensitive intended capsule core material dispersed in a hydrophobic organic liquid medium. Liquid-liquid phase separation in the process of the above-mentioned patent is accomplished by addition, to the system, of phase-separation-inducing polymeric material not soluble or miscible with the polymeric capsule wall material. A portion of the phase-separation-inducing polymeric material, of course, remains mixed with but undissolved by the capsule wall material of the capsule product. In contrast to the above-mentioned process of Powell et al., the encapsulation process of the present invention provides that liquid-liquid phase separation of the capsule manufacturing system can be accomplished and maintained by elevating the temperature of the system to a certain phase separation temperature below which temperature the polymeric capsule wall component and the phase-separation-inducing component are miscible to yield a solid, substantially homogeneous, solution when dried.

United States patent application, Ser. No. 413,348, filed Nov. 23, 1964, and now abandoned in the name of Joseph A. Bakan and assigned to the assignee herein discloses a process for preparing capsules in an aqueous liquid vehicle wherein the hydrophilic capsule wall-forming polymeric material utilized, has a decreasing solubility in the vehicle with increasing temperature. The above-mentioned patent application does not utilize two mutually miscible polymeric materials to yield a solid, substantially homogeneous, solution of polymeric film for the capsule walls. Moreover, there is no indication that capsules prepared according to teaching of the above-mentioned patent application are useful for containing hydrophilic materials such as water, aqueous solutions or water-sensitive solids. The present invention, on the other hand, utilizes two hydrophobic polymeric materials which do form a substantially homogeneous solid solution to provide capsule walls useful for containing hydrophilic materials.

SUMMARY OF THE INVENTION

Liquid-liquid phase separation processes for establishment of two-liquid-phase systems are well-known wherein a first, un-ionized polymeric material, in solution in a liquid vehicle, is caused to emerge from solution in the vehicle as a separate liquid phase. Emergence can be accomplished by addition, to the system, of a second un-ionized polymeric material. The emergent liquid phase has, in solution, a major portion of the first un-ionized polymeric material and a minor portion of the second un-ionized polymeric material. The liquid vehicle has, in solution, a major portion of the second un-ionized polymeric material and a minor portion of the first un-ionized polymeric material. Under forces of agitation, the emergent liquid phase becomes a discontinuous dispersed phase in the liquid vehicle which vehicle constitutes a continuous phase.

Encapsulating processes which include the above-described liquid-liquid phase separation utilize, as capsule wall material, the polymeric material constituents of the emergent liquid phase. Such capsule wall material, therefore, includes a combination of a major amount of the first polymeric material and a minor amount of the second polymeric material. Until the time of the present invention, dried capsule walls of the above capsule wall material contained two solid phases of polymeric material—the two polymeric materials, in the dry state, being mutually immiscible at temperature and humidity conditions of normal capsule use. In other words, those capsule walls of the prior art consisted of a matrix of the first polymeric material having, dispersed throughout, discontinuities or "grains," of the second polymeric material. In a few of the prior art encapsulating processes, the "grains" of the second polymeric material were recognized as an undesirable contaminant and attempts were made to wash them out of the capsule walls before the walls were dried.

The present invention provides an encapsulating process utilizing polymeric capsule wall materials which are mutually miscible to yield a solid, substantially homogeneous, solution in the dry state. Capsule walls produced by the process of the present invention are free form "grains" of contaminating polymeric material at temperature and humidity conditions of normal capsule use.

An especially important aspect of the present invention relates to a novel method for accomplishing the liquid-liquid phase separation. The process of the present invention includes utilizing two hydrophobic polymeric materials in a liquid solvent system just as in processes of the prior art; but the present invention includes a completely novel step of elevating the temperature of the system in order to cause the liquid-liquid phase separation. The two polymeric materials of the present encapsulating system are each individually soluble in the solvent of the system and are together soluble in the solvent of the system, provided only that the system temperature is below a critical phase separation temperature. Establishment of a liquid-liquid phase separated system at an elevated temperature and utilizing at least two hydrophobic polymers in an organic liquid solvent is novel wherein the liquid phases reversibly recombine into a single liquid phase at some reduced temperature.

It is often desired or required to manufacture capsules which contain water, aqueous solutions or water-sensitive materials; such materials being hereafter named "hydrophilic" materials. An object of the present invention is to provide an encapsulating process wherein capsule wall formation is accomplished by liquid-liquid phase separation utilizing at least two polymeric materials which exist, with an organic solvent, in a solution of single liquid phase below a certain temperature and which yield a separated liquid phase at an elevated temperature.

Another object of the present invention is to provide an encapsulating process for manufacturing, en masse, in a liquid manufacturing vehicle, minutes capsules having capsule walls of a solid, substantially, homogeneous, solution of at least two polymeric materials.

A more specific object of the present invention is to provide such an encapsulating process for manufacturing minute capsules containing hydrophilic materials which capsules have walls of a solid, substantially homogeneous, solution of at least two hydrophobic polymeric materials.

A further object of the present invention is to provide an encapsulating process, such as those above-mentioned, having the additional step of over-coating the capsules with a waxy material to produce dual-walled capsules having improved resistance to loss of polar materials by diffusion-through-the-capsule-walls.

Steps used in practice of embodiments of the present invention include:

(a) establishing a liquid system of at least two hydrophobic polymeric materials in at least one, substantially water-insoluble, liquid solvent material—the polymeric materials being selected such that they form a homogenous, single phase, liquid solution in the solvent material below a certain critical temperature and undergo liquid-liquid phase separation above the critical temperature;

(b) dispersing, in the liquid system, particles of hydrophilic or solvent insoluble intended capsule core material;

(c) adjusting the temperature of the agitating system to a temperature above the critical liquid-liquid phase separation temperature to achieve phase separation of the polymeric material;

(d) maintaining the temperature of the system for a time sufficient to permit wetting and enwrapping of the dispersed particles of intended capsule core material by the separated phase to form liquid-walled, embryonic, capsules and;

(e) quenching the capsules of step (d) in a liquid, insoluble with the polymeric materials to form rigid-walled capsules having capsule walls of substantially homogeneous solution of the polymeric materials.

Optionally, the liquid of step (e) can be maintained at a temperature below the critical temperature.

Of course, it is also possible to establish the encapsulating system by combining the polymeric materials and the liquid solvent material at a temperature above the phase separation temperature, thereby creating, the two-liquid-phase encapsulating system in a single step.

If it is desired, the intended capsule core material can be dispersed in the liquid solvent material before, or at any time during, establishment of the liquid system described by step (a), above, or the intended capsule core material can be dispersed after, or during, the temperature adjusting step (c), above.

The phase-separated liquid encapsulating system of this invention, once established with the particles of intended capsule core entities, can be thought of as a three-phase system wherein the, dispersed intended capsule core entities comprise a minor volume, the separated liquid phase also comprises a minor volume and the continuous liquid phase, which serves to support the dispersed materials, comprises a major volume. The separated liquid phase is relatively rich in hydrophobic polymeric phase-separation-inducing-material.

Applicant has discovered that certain polymeric materials can be dissolved in selected solvents to yield a single-phase solution and then, when the temperature of the solution is elevated to a predetermined phase separation temperature, the polymeric materials undergo liquid-liquid phase separation. Furthermore, applicant has discovered that the separated liquid phase can be used to form liquid capsule walls about dispersed particles of intended capsule core material. Such liquid-walled, embryonic, capsules, when "quenched" in a liquid which is a solvent for the manufacturing vehicle and is a non-solvent for the polymeric materials, are transformed into solid-walled capsules having, as the solid capsule wall, a substantially homogeneous solid solution of polymeric material.

An important feature of the present invention resides in applicant's discovery that capsules can be manufactured by liquid-liquid phase separation means under temperature conditions in which capsule wall forming polymeric material is immiscible with phase-separation-inducing polymeric material and that when the conditions can be altered (the temperature can be lowered) to yield a finished capsule product wherein the capsule wall forming polymeric material and the phase-separation-inducing polymeric material are mutually miscible and present as a substantially homogeneous solid solution. It is now possible to manufacture capsules, by a liquid-liquid-phase separation process utilizing temperature change as the phase-separation-inducing means, wherein the capsule walls of hydrophobic polymeric material are uncontaminated by "grains" of immiscible phase-separation-inducing material.

It has been a generally applied rule in the past that different polymeric materials in the same solution system can be expected to demonstrate mutual immiscibility and that one or more of the polymeric materials will, therefore, exist in the system as a separated phase. For reasons not entirely understood, it has now been discovered that mutual miscibility or mutual immiscibility of two or more polymeric materials in a common solvent system can be controlled by careful control of the kinds and amounts of polymeric material used, the kind of solvent system used, and the temperature of the polymeric material-containing system.

In practice of the present invention, liquid-walled capsules are manufactured above the temperature affording liquid-liquid phase separation. The liquid-walled capsules, dispersed in manufacturing vehicle, are then immersed in an abundance of "quenching liquid" which is a solvent for the manufacturing vehicle and a nonsolvent for the polymeric materials. The "quenching liquid" serves to extract manufacturing vehicle from the liquid capsule walls and leaves behind capsules having solidified walls of polymeric material. The polymeric material walls of the quenched capsules, when at a temperature below the phase separation temperature, exist as substantially homogeneous solid solutions of polymeric materials.

Materials which have been found to be useful in the present invention as capsule manufacturing materials can be disclosed as complete systems of components for capsule manufacturing. For example, a preferred embodiment includes halogenated rubber as the polymeric capsule wall material, poly(ethylene-co-vinylacetate) as the polymeric phase-separation-inducing material and a solution of cyclohexane and toluene as the manufacturing vehicle. The above-named pair of polymeric materials has also been used with other solvents including benzene, toluene, xylene, and carbon tetrachloride. As a further example, it has been found that a system which includes halogenated rubber and isotactic poly(vinylmethyl ether) in methylisobutyl ketone solvent exhibits liquid-liquid phase separation on heating to a temperature above a certain phase-separating temperature range. The phase-separating temperature for the system of halogenated rubber, isotactic poly(vinylmethylether), methylisobutyl ketone is about 60 to 65 degrees centigrade wherein the total polymers are in solution in a total concentration of about 10 percent, by weight, and the polymeric materials are present in a one-to-one ratio, by weight. Such a system can be used to manufacture capsules according to the process of this invention by heating the system to about 95 to 105 degrees centigrade.

Materials eligible to be encapsulated by the process of this invention include any solids and liquids which are substantially insoluble in the manufacturing vehicle and which do not chemically react with components of the encapsulating system. The intended capsule core entities (internal phase particles) do not play an active role in the encapsulating process and can be any material meeting the above-mentioned requirements. A few broad examples of eligible materials include: water and aqueous solutions; natural and synthetic fibers; inorganic salts; minerals; elemental solids and liquids; insoluble polymeric materials; and a multitude of other materials.

The capsules are substantially spherical and can be made in a wide range of sizes and with a wide range of internal phase content. Capsule size is usually in the range of from a few microns to several thousand microns in diameter; about 20 microns to about 2000 microns being preferred and about 150 microns to about 1500 microns being most preferred. Internal phase content of capsules manufactured by the present invention can be from near zero to more than 95 percent, by weight. It is, of course, possible to manufacture spheres of the phase-separated polymeric material with no internal phase whatever, if such is, for some reason, desired or required. Such spheres are considered to be capsules of zero internal phase content. Capsules usually have internal phase contents from about 50 percent to about 90 percent, by weight.

The phase-separating temperature of the present process can be controlled, to some degree, by adjustment of the amounts of polymeric materials in the encapsulating system. Also, it should be understood that, in some systems, phase separation can exist before increase in the system temperature; because the concentration of materials used in those systems is such that all of the wall-forming polymeric material cannot be dissolved.

Having disclosed the present invention in a general manner, specific examples of preferred embodiments of the invention will now be disclosed. The examples presented herein are not intended to limit the invention to specific materials or encapsulating procedures.

DESCRIPTION OF PREFERRED EMBODIMENTS

Example 1

In this example, capsules are manufacture which contain water as an internal phase material. Polymeric phase-separation-inducing material in this example is poly(ethylene-co-vinylacetate) (EVA) having a number average molecular weight of about 12,800 and containing about 27–29 percent, by weight, vinyl acetate groups (sold by E. I. du Pont de Nemours & Co., Wilmington, Del., U.S.A., under the trade name "Elvax 210"). Polymeric capsule wall material in this example is chlorinated rubber (CR) having a number average molecular weight of about 52,000 and containing about 53.2 percent, by weight, chloride groups (sold by Hercules Powder Co., Wilmington, Del., U.S.A., under the trade name "Parlon S-20"). Solvents used in this example are cyclohexane and toluene.

Add 100 grams of 10 percent, by weight, EVA solution in cyclohexane and 6 grams of additional cyclohexane to a closed flask equipped for heating and agitation. Begin slow agitation and heat the solution to about 70 degrees centigrade. Slowly add 40 grams of water to the warmed, stirring system. Maintaining the temperature at 70 degrees centigrade, add a solution of 10 grams of the CR in 85 grams of toluene to the agitating system in a dropwise fashion. The size of the water droplets should be adjusted during the step of adding the CR solution. After addition of the CR solution, the system should be permitted to stir for an additional two hours and then about 35 grams of cyclohexane should be added dropwise. After one more hour of stirring, siphon the water-containing capsules into a "quenching bath" of cyclohexane to solidify the polymeric capsule walls. In this example, the quenching bath can be about 25 degrees centigrade.

It should be noted that, although liquid-liquid phase separation may exist below the encapsulating temperature of about 70 degrees centigrade, an adequate amount of separated polymeric capsule wall material is not available until the 70 degree temperature is attained. If the concentrations used in this system were changed, the optimum encapsulating temperature could be changed.

Example 2

Water-containing capsules made according to the above recipe and having a diameter of about 1500 to 2000 microns were wax-coated by immersing the capsules into a 10 percent, by weight, cyclohexane solution of wax wherein the wax was one part, by weight, EVA (described above) and 3 parts, by weight, solid paraffinic wax. Capsules immersed in the wax solution and dried had a dual-layer capsule wall; the inner layer being substantially homogeneous solid solution of the CR and the EVA and the outer layer being the above-described wax mixture. The capsules contained about 80 percent, by weight, water. In weight loss tests (conducted at about 25 degrees centigrade and at about 66 percent relative humidity), samples of the capsules exhibited "half lives" of from 5 to more than 13 weeks. A "half life" represents the time required for loss of one-half of the encapsulated material under the specified conditions.

Example 3

This example is included to demonstrate that the novel encapsulating process can be practiced by temperature adjusting steps only, without steps for addition of materials EVA, CR, cyclohexane, toluene and water of the description and in the amounts used in Example 1 are added to the closed flask of Example 1. The starting temperature of the system is unimportant. The temperature is slowly adjusted to about 70 degrees centigrade to cause liquid-liquid phase separation and the system is agitated slowly to maintain large water-droplet size, if such is desired. After agitating the system for a time sufficient to permit formation of liquid-walled capsules and then agitating for an additional one hour, about 35 grams additional of cyclohexane is added. This additional cyclohexane is added slowly to avoid agglomeration of the liquid-walled capsules. The system is then agitated for one more hour and the capsules are siphoned into a quenching bath of cyclohexane. The solid-walled capsules can be isolated from the cyclohexane bath by simple filtration and evaporation techniques. The resulting capsules contain about 90 percent, by weight, water.

Example 4

To further demonstrate that starting temperature of the system is unimportant, the materials of Example 3, above, are combined at an initial temperature of about 70 degrees centigrade. The separated liquid phase is, thereby, immediately formed and wets and wraps the water droplets to yield liquid-walled capsules. The liquid-walled capsules are completed in the same manner as used in Example 3. Of course, any of the above examples can be employed to encapsulate materials other than water or aqueous solutions; simple, approximately, volume-for-volume substitution being all that is required. For example, sand or mercury or cellulose fibers can be substituted for the above.

What is claimed is:

1. A minute capsule containing an aqueous liquid and having a seamless wall of a substantially homogeneous solid solution of hydrophobic polymeric materials consisting of a major portion of halogenated rubber material and a minor portion of poly(ethylene-co-vinylacetate)material.

2. The minute capsule of claim 1 wherein there is an additional over-coating capsule wall layer consisting of a hydrophobic waxy material.

3. In a process for manufacturing minute capsules, en masse, in a liquid manufacturing vehicle, wherein intended capsule core entities are dispersed in the manufacturing vehicle and are wet and wrapped by mobile, dispersed, globules of a separated liquid phase relatively rich in hydrophobic polymeric capsule wall material which liquid phase has been separated from the manufacturing vehicle by means of a hydrophobic polymeric phase-separation-inducing material and which liquid phase includes a small amount of said phase-separation-inducing material, the improvement which comprises utilizing a system of manufacturing vehicle, halogenated rubber polymeric material, and phase-separation-inducing material selected from the group consisting of poly(ethylene-co-vinyl acetate) and poly(vinylmethyl ether) which undergoes liquid-liquid phase separation by increase in temperature and increasing the temperature of the manufacturing vehicle to cause liquid-liquid phase separation and formation of the embryonic capsules.

4. In the improved process of claim 3, the additional improvement of quenching the so-manufactured embryonic capsules in a nonsolvent for the capsule wall material to harden the capsule wall material and thereby render it self-supporting.

5. A process for manufacturing capsules, en masse, which capsules have walls of a substantially homogeneous solid solution of hydrophobic polymeric film material, in a liquid-liquid phase separating system wherein at least two hydrophobic polymeric materials dissolved, below a temperature, to yield a single phase in a solution of two liquid solvents, exist above the temperature, as major polymeric material components of two individual liquid phases, said process comprising the steps of:

(a) dispersing particles of intended capsule core entities into an agitating liquid consisting of a halogenated rubber polymeric capsule wall material dissolved in a first of two liquid solvents;
 (b) adding to the agitating liquid a hydrophobic polymeric phase-separation-inducing material selected from the group consisting of poly(ethylene-co-vinyl acetate) and poly(vinylmethyl ether) and dissolved in a second of two liquid solvents;
 (c) adjusting and maintaining the temperature of the agitating liquid above a temperature required to cause liquid-liquid phase separation between the two polymeric materials, one separated phase consisting of mobile globules of liquid, relatively rich in halogenated rubber polymeric capsule wall material and having a small amount of hydrophobic polymeric phase-separation-inducing material which globules wet and wrap the particles of intended capsule core entities to form embryonic capsules; and
 (d) quenching the embryonic capsules in a liquid nonsolvent for the halogenated rubber polymeric capsule wall material thereby hardening the capsule wall material to yield capsule walls of substantially homogeneous films of a solid solution of a major amount of capsule wall material component and a minor amount of phase-separation-inducing material component.

6. The process of claim 5 wherein the particles of intended capsule core entities are droplets of an aqueous liquid.

7. A process for manufacturing capsules, en masse, which capsules have walls of hydrophobic polymeric material, in a liquid-liquid phase separating system wherein at least two hydrophobic polymeric materials, in solution, in an organic solvent liquid, below a certain phase-separating temperature, exist above the phase-separating temperature as major polymeric material components of two individual liquid phases, said process comprising the steps of:

(a) establishing an agitating three-phase liquid system comprising, in a minor volume, dispersed particles of intended capsule core entities, also in a minor volume, a dispersed separated liquid phase relatively concentrated in a halogenated rubber polymeric capsule wall material and, in a major volume, a continuous liquid phase relatively concentrated in a hydrophobic polymeric phase-separation-inducing material selected from the group consisting of poly(ethylene-co-vinyl acetate) and poly(vinylmethyl ether); the system having a temperature above that required for liquid-liquid phase separation;

(b) maintaining the system, once established, for a time adequate to permit globules of the dispersed separated liquid phase to wet and wrap the particles of intended capsule core entities to yield embryonic capsules.

8. The process of claim 7 wherein is included the additional step:

(c) quenching the embryonic capsules in a liquid nonsolvent for the halogenated rubber polymeric capsule wall material which liquid is also a solvent for the organic solvent liquid, thereby hardening the capsule wall material.

9. The process of claim 7 wherein the particles of intended capsule core entities are droplets of an aqueous liquid.

References Cited

UNITED STATES PATENTS

| | | | |
|---|---|---|---|
| 3,161,602 | 12/1964 | Herbig et al. | 252—316 |
| 3,415,758 | 12/1968 | Powell et al. | 252—316 |
| 3,460,972 | 8/1969 | Nack | 252—316 X |

FOREIGN PATENTS

| | | | |
|---|---|---|---|
| 1,048,696 | 11/1966 | Great Britain | 252—316 |

RICHARD D. LOVERING, Primary Examiner

U.S. Cl. X.R.

117—100 A, 100 B, 100 M, 100 S; 264—4; 424—33, 38